C. B. DAVIS.
PROCESS OF MASHING.
APPLICATION FILED JAN. 29, 1915.
1,328,079.
Patented Jan. 13, 1920.
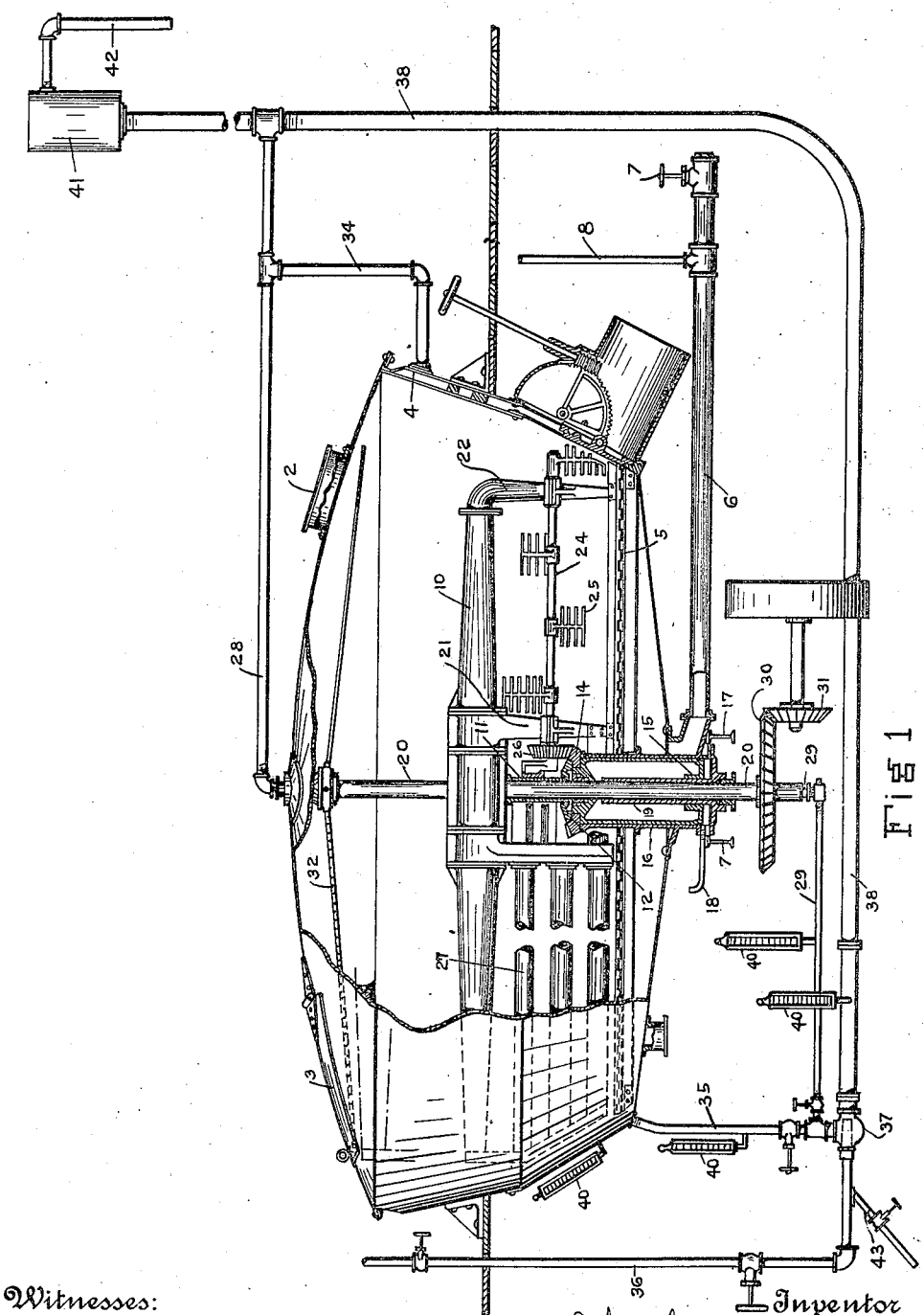
Witnesses:
Helen V. Fitzpatrick
Mary H. Lewis
Inventor
Charles B. Davis
By his Attorney

UNITED STATES PATENT OFFICE.

CHARLES B. DAVIS, OF NEW YORK, N. Y.

PROCESS OF MASHING.

1,328,079.  Specification of Letters Patent.  Patented Jan. 13, 1920.

Application filed January 29, 1915. Serial No. 5,161.

*To all whom it may concern:*

Be it known that I, CHARLES B. DAVIS, a citizen of the United States, residing at New York, in the county of New York and State of New York, have invented certain new and useful Improvements in Processes of Mashing, of which the following is a specification.

This invention relates to improvements in methods of treating enzymatic masses, more specifically to the art of mashing. It is useful in brewing, that is, the making of beer, ale, alcohol, &c., in distilling, in concentrating enzymatic syrups, and in other analogous arts.

I shall herein describe the process which constitutes my invention in connection with the mashing of a mixture of water, grain and malt materials such as are employed in the making of beer and the like, but it will be understood that the description based upon the behavior of these particular ingredients under my process, is illustrative merely, and is not to be taken as in any way limitative of the claims.

In the accompanying drawing the figure illustrates, partly in elevation and partly in section, a mash-tun or receptacle which may be employed in carrying out my process.

At normal temperatures, that is from 32° F. to 86° F., all enzyms, such as peptase, and diastase, pass into solution. Peptases act upon peptones or similar degradation products of protein; diastase converts starch into sugar. The activity of these enzyms begins as the temperature increases from 70° F. and changes with the increase of temperature above that point. At 86° F. there is substantially no action save that of softening the grain and dissolving already formed sugar, peptase and diastase. At about 113° F. peptase becomes active, the diastase is practically inactive. At 131° F. the peptase becomes inactive. From this point to 149° F. the diastase increases its activity as a saccharifier. At 150° F. the activity of the diastase starts to lessen, at 151° to 158° it becomes still weaker, at 162° F. it is very weak, and at 167° F. it practically ceases to be a saccharifier, though it is still active as a starch liquefier. At 176° to 185° F. further activity is noticed resulting in the transformation of the jelly of hemicellulose (granulose, starch cellulose, amylo-pectins, pentosans and hexosans), to starch in a gelatinized and insoluble state. It will accordingly be evident that the proportions of soluble albuminoids and sugar in the resulting extract will depend upon the temperatures to which the mash is subjected. For instance, at 147° F. the proportions of sugar and non-sugar in the extract is about 1.0 sugar to 0.37 non-sugar, at 150° F. about 1.0 sugar to 0.40 non-sugar, at 155° F. about 1.0 sugar to 0.48 non-sugar, at 157° F. about 1.0 sugar to 0.52 non-sugar, at 162° F. about 1.0 sugar to 0.57 non-sugar.

If it is desired to produce ale, the mash will be brought to that condition and temperature where the proportions will be 1.0 sugar to 0.37 non-sugar. For lager beer, I prefer from 1.0 sugar to between 0.48 and 0.57 non-sugar, which result may be attained by raising the temperature to about 156° F. If one desires to prepare a distiller's mash for production of alcohol, the mash is maintained between the temperatures 140° F. and 150° F., which allows the diastase to form practically all sugar from the saccharification of the starch, since it is the sugar that forms the alcohol by fermentation.

In present day practice this heating of the mash is accomplished either by means of direct or live steam, or indirect heating by means of a steam coil, or a steam jacket, or direct hot water. Of these methods the one in general use is that of employing live steam, which is discharged directly into the mash. This direct steam method is subject to objections, because it is very difficult to distribute the steam throughout the mass of the mash. In the case of too fine distribution, that is, if a circular steam pipe with too small perforations led inside the edge of the bottom of the tub, the mash would be overheated at that part, and the stirrers and shovels would have to work hot mash to the center in order to mix the whole mash. In the case of insufficient distribution of the steam, on the other hand, that is, if one large steam inlet only were used, the steam would overheat a part of the mash in a straight streak, across the mash and the stirrers would take considerable time in equalizing the temperature of the whole mash. In either case the indication of the thermometer at the time the steam is shut off would be misleading, as that part of the mash near the steam inlets would be much hotter than the bulk of the mash, the disadvantage of which needs no explanation to one skilled in the art.

The steam coil and steam jacket cause a similar uneven heating of the mash and have the additional disadvantage of consuming more steam than would be necessary if live steam were employed, due to the loss of the hot water or condensed steam which is run away, and its latent heat, when liberated directly to the walls of the coil or jacket, burns the mash and kills the enzyms.

To heat the mash with hot water under present practice, such water is first heated in a separate tank, and run into the mash through the bottom. The objection to this method is that a wide range of temperature is not attainable, and high initial temperatures must be used, or the mash becomes too thin. The boiling water which must be used has such a high temperature, compared with the mash, that the mash is deleteriously affected, as hereinbefore and hereinafter explained. Furthermore, the amount of water that can be used for sparging the grains becomes too limited, which results in less perfect extraction of the grains, and loss of extract.

Whether steam be employed to heat the mash by direct application or indirectly through a coil or jacket, it will have of course a very much higher temperature than the mash at the beginning of operations. The consequence is that the sudden rise of temperature kills some of the diastase, and so much as is thus killed is of course incapable of further useful activity. Another objection to the use of steam is due to the fact that there is an immense amount of latent heat given up by the steam when it condenses and this causes "burning" of the mash, and caramelization. It may be that the amount of material scalded is comparatively small but unquestionably it is sufficient to interfere with the activity of the enzyms and to appreciably curtail the yield.

Some of the same objections are to be noted where hot water is applied directly to the mash. Furthermore, since the quantity of water to be used in making a brewing is limited, if much of it is used for raising the temperature of the mash, there will be so much the less left to be used for sparging, because if the total quantity of water used be excessive, the extract will be dilute and it will be necessary to concentrate it by boiling off some of the extra water. And if the amount left for sparging be too small, there may not be sufficient of it to secure the thorough removal from the mash of the elements which go to make up the extract, and the yield will be correspondingly small.

In accordance with my process, the mash materials are placed within a tun of the sort shown in the drawing. The tun is indicated in a general way by the reference character 1 and has a cover provided with a manhole 2 and door 3. The tun is water-jacketed as indicated at 4 and has a strainer bottom 5 and a bottom outlet 6 controlled by a valve 7. Preferably I also employ a sight gage 8 by the use of which it is possible to determine whether or not the drainage from the grains is going on too rapidly. Inside the tun there is a revolving rake and stirring apparatus, comprising a beam 10 mounted on the end of a vertical sleeve 11 whose lower end bears upon a disk 12 that is set into a beveled gear 14 which in turn rests upon a hollow piston or plunger 15. This plunger 15 reciprocates within a cylinder 16 which rests upon suitable supports 17, and 18 indicates an inlet for hydraulic pressure below the plunger 15. The plunger is guided in its reciprocation by means of an internal sleeve 19 formed on the cylinder 16, and the inside of this sleeve 19 accommodates a drive sleeve 20 which extends also through the plunger 15, beveled gear 14, disk 12, sleeve 11 and beam 10. The beam 10 supports by means of brackets 21 and 22 an agitator shaft 24, on which are mounted agitator members 25. The shaft 24 is caused to rotate by means of a beveled gear at its inner end indicated by the numeral 26, which beveled gear meshes with the beveled gear 14. One portion of the beam 10, in the present instance that portion which is to the left of the center in Fig. 1, is hollow and is in communication with the upper end of the sleeve 20. This hollow portion of the beam 10 at its outer end, that is toward the left in the drawing, is in communication with a series of parallel pipes 27. A pipe 28 discharges through the cover of the tun into the sleeve 20, which latter is of course blocked off below the beam 10. Consequently, water coming through pipe 28 into the upper end of sleeve 20 finds its way through the hollow portion of the beam 10 into the several pipes 27, whence it is discharged through any suitable connection into a pipe 29 that passes upwardly through the lower part of sleeve 20. Thus provision is made for a circulation of water through the pipes 27. The beam 10 and with it the pipes 27 and agitator shaft 24 may be raised and lowered by proper control of the hydraulic fluid from pipe 18, and the beam 10 may be caused to rotate within the tun by means of a beveled gear 30 on the shaft 20, driven from a beveled gear 31. The numeral 32 indicates a sparger, which is also supplied with water from the pipe 28 by means of any suitable connection.

As before stated, water is introduced into the traveling pipes 27 from the supply pipe 28, and the water after passing through these pipes 27 discharges through the pipe 29. At the same time water is supplied from pipe 34 to the jacket 4, whence it discharges through pipe 35.

In the use of the invention the system is filled with water at ordinary temperatures, which will accordingly be about the temperature of the mash mixture. Steam is now permitted to pass through a pipe 36 and through an injector device 37, which pulls the water out of pipes 29 and 35 and propels it through pipe 38, which pipe 38 is in communication with the pipes 28 and 34, thereby causing a continuous circulation of the water in the system through the pipes or rakes 27 and through the water jacket 4. The steam has also the function of gradually raising the temperature of the water which it is causing to circulate. Thermometers 40 are conveniently placed to indicate the temperature of the mash, of the water in the water jacket, in the pipes or rakes 27, and in the pipe 38. It is my aim to raise the temperature of the mash gradually and I contemplate that the water entering the jacket or rake shall not at any time be more than a few degrees higher in temperature than the mash within the tun, and the raising of the temperature of the water or heating medium is gradual and without sudden shocks, and so is also the increase in temperature of the mash. Because of this progressive temperature change and exchange, and because of the fact that I use hot water as a heating medium and not steam, scorching, caramelization, killing and shocking of the enzyms and other objectionable phenomena noted above are absolutely avoided. Furthermore, because I employ a heating medium whose temperature can never, under ordinary conditions, even reach 212° F. or contain latent heat, it would be practically impossible in any event to scorch or burn the mash. Two points therefore I deem of importance: first, the use of hot water as an indirect heating medium for the mash which contains only 180.8 heat units per pound above 32° F., while steam contains 1146.6, of which 965.8 is latent and would be set free instantly on condensation against the walls of jacket and rake tubes with destruction of the enzyms. In my hot water system the latent heat is liberated and spends its fury heating the water outside the jacket and rakes, thus saving steam and protecting the activity of the enzyms. And, secondly, beginning operations with the heating medium at substantially the same temperature as the mash, and then accomplishing a gradual increase of temperature in the heating medium and a corresponding gradual increase in temperature of the mash, the latter lagging always just a little way behind. Furthermore, the method is very economical of water, because the latter is in a substantially closed circuit and the heat units are practically all absorbed by the mash.

When any desired temperature of the mash is reached, this will be indicated by the appropriate thermometer 40, and if it is necessary to hold that temperature for a time this may be readily accomplished by manipulation of the steam pipe. The surplus water in the system resulting from the condensation of the steam, overflows from the expansion tank 41 into an overflow pipe 42. By regulating the steam and cold water pipes 36 and 43 the temperature of the mash may be either raised or lowered and may be held at any particular temperature to which it is thus brought for any desired length of time. The action of the revolving beam 10 with its rakes 27 and agitators 25 is of course familiar, and the raising and lowering of the beam, by raising and lowering the plunger 15, is to accomplish the thorough mixing of the mash throughout all of the strata thereof.

I claim:

1. The process of heating mash or the like enzymatic mass, which consists in subjecting the same to the indirect heating action of hot water by bringing the water gradually up from the initial temperature of the mash to the desired temperature and applying the water, so gradually heated, to the mash indirectly and throughout the mass thereof, so that the mash will be gradually and uniformly heated throughout, and maintaining the heating water in a closed circuit.

2. The improvement in the art of mashing which consists in subjecting mash to the indirect temperature-changing action of water, by gradually changing the temperature of the water from the initial temperature of the mash to that temperature to which it is desired to bring the mash, meanwhile keeping the water in circulating indirect contact with the mash.

In testimony whereof I affix my signature in presence of two witnesses.

CHARLES B. DAVIS.

Witnesses:
WM. RAIMOND BAIRD,
ALDA L. MILLER.